(12) United States Patent
Liu et al.

(10) Patent No.: US 7,493,020 B2
(45) Date of Patent: Feb. 17, 2009

(54) DIGITAL VIDEO MULTIPLEX PROCESSING METHOD AND DEVICE

(75) Inventors: Ren-Shuo Liu, Taipei (TW); Hsin-Chih Hsiao, Taipei (TW)

(73) Assignee: Ali Corporation, Taipei (TW)

( * ) Notice: Subject to any disclaimer, the term of this patent is extended or adjusted under 35 U.S.C. 154(b) by 872 days.

(21) Appl. No.: 10/933,421

(22) Filed: Sep. 3, 2004

(65) Prior Publication Data

US 2005/0271362 A1 Dec. 8, 2005

(30) Foreign Application Priority Data

Jun. 8, 2004 (TW) .............................. 93116407 A (51) Int. Cl.
*H04N 5/91* (2006.01)
(52) U.S. Cl. .............................. 386/69; 386/70; 386/125
(58) Field of Classification Search .................. 386/69, 386/70, 125
See application file for complete search history.

(56) References Cited

U.S. PATENT DOCUMENTS 6,065,050 A * 5/2000 DeMoney .................. 709/219

* cited by examiner

*Primary Examiner*—Thai Tran
*Assistant Examiner*—Girumsew Wendmagegn
(74) *Attorney, Agent, or Firm*—Birch, Stewart, Kolasch & Birch, LLP (57) ABSTRACT

A digital video multiplex processing method comprises the following steps: setting a normal play index and a fast play index; performing a normal recording/playback action of a video data; determining whether to let the video data enter a cue-and-jump action; taking track of the fast play index in the video data; performing conversion of the video data; and setting the normal play index to be equal to the fast play index. A digital video multiplex processing device comprises a video medium readout unit, a drive interface unit, a data regulation unit, a data buffer unit, an image decoding unit, a sound decoding unit, an image processing unit, a sound processing unit, and a control unit. The control unit is used to receive operation instructions of a user to control the operation of the digital video multiplex processing device.

18 Claims, 7 Drawing Sheets

DIGITAL VIDEO MULTIPLEX PROCESSING METHOD AND DEVICE

This Non-provisional application claims priority under 35 U.S.C. §119(a) on patent application No(s). 93116407 filed in Taiwan, Republic of China on Jun. 8, 2004, the entire contents of which are hereby incorporated by reference.

BACKGROUND OF THE INVENTION

Electronic products for playing multimedia become more and more popular. For instance, ordinary VCD players and DVD players can play many kinds of multimedia formats like AVI, MOV, MPG, JPG, and so on. Existent DVD players provide some basic functions such as play, reverse, forward, stop, and so on.

A video disc, especially a DVD disc, stores a large amount of video content. Therefore, some users won't play the whole video disc in proper sequence from beginning to end. They will first play a section of video and then jump to another section in which they are interested.

In conventional DVD players, however, the normal play function can't be used together with the fast play function. A user needs to interrupt normal play of a DVD disc for fast play to look up other video sections. The mood for enjoying a movie is thus interrupted, hence affecting the entertainment effect.

Accordingly, the present invention aims to propose a digital video multiplex processing method and device to solve the above problems in prior art.

1. Field of the Invention

The present invention relates to a digital video multiplex processing method and device and, more particularly, to a method and device capable of simultaneously performing fast play to look up other sections of a video medium (e.g., a VCD disc or a DVD disc) when playing the video medium.

2. Description of Related Art

SUMMARY OF THE INVENTION

An object of the present invention is to provide a digital video multiplex processing method and device. The digital video multiplex processing method comprises the steps of: setting a normal play index and a fast play index; performing a normal recording/playback action of a video data; determining whether to let the video data enter a cue-and-jump action; taking track of the fast play index in the video data; performing conversion of the video data; and setting the normal play index to be equal to the fast play index.

The digital video multiplex processing device comprises a video medium readout unit, a drive interface unit electrically connected with the video medium readout unit, a data regulation unit electrically connected with the drive interface unit, a data buffer unit electrically connected with the drive interface unit and the data regulation unit, an image decoding unit electrically connected with the data regulation unit, a sound decoding unit electrically connected with the data regulation unit, an image processing unit electrically connected with the image decoding unit, a sound processing unit electrically connected with the sound decoding unit, and a control unit electrically connected with the drive interface unit, the data regulation unit, the image decoding unit and the image processing unit and used to receive operation instructions of a user to control the operation of the digital video multiplex processing device.

The various objects and advantages of the present invention will be more readily understood from the following detailed description when read in conjunction with the appended drawings, in which:

DETAILED DESCRIPTION OF THE PREFERRED EMBODIMENTS

Figure 1:
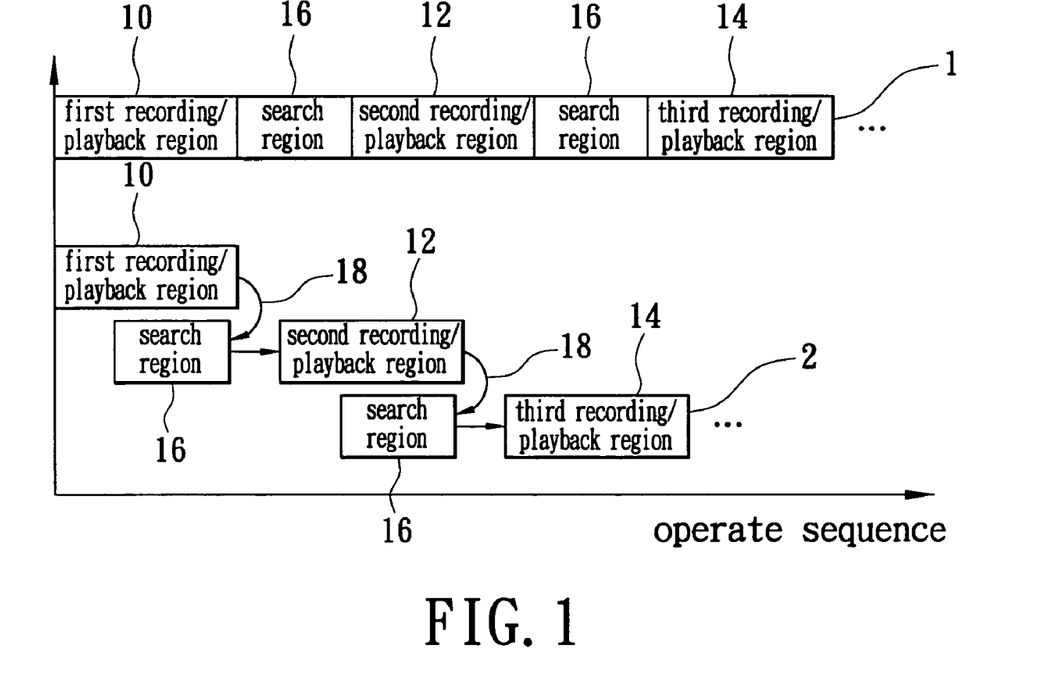
FIG. 1 is a comparison diagram of fast play sequences of the prior art and the present invention.

FIG. 1 is a comparison diagram of fast play sequences of the prior art and the present invention. The transverse axis represents the operational sequence. When a user uses a remote controller to control a conventional DVD player for performing playback of a video disc at the same time of fast forward/reverse, he needs to interrupt the played content of a first recording/playback region 10 in the fast play sequence 1 of the prior art. Moreover, when the DVD player receives a fast forward/reverse signal from the remote controller, it performs a fast forward/reverse search function and jumps to a search region 16. When the user finds the frame he wants to watch, the DVD player will play the content of a found second recording/playback region 12 after receiving a playback signal.

Similarly, when the user wants to search for the next content he is interested in, the DVD player will repeat the above actions. In other words, it will interrupt the content of the second recording/playback region 12 and enter into the search region 12 to perform fast forward/reverse for finding the content to be watched. After the next content the user is interested in has been found, the DVD player will jump into a third recording/playback region 14 to play the content. The above steps are repeated continuously.

The present invention proposes a digital video multiplex processing method. In the fast play sequence 2 of the present invention, the playback and the fast forward/reverse functions of the content of the DVD disc can be accomplished simultaneously without any interruption. When the user watches the played content of the first recording/playback region 10, he can make use of the picture-in-picture (PIP) function of the present invention to continue playing the content of the first recording/playback region 10 while searching for the content to be watched in a sub-frame in the search region 16. The above steps are repeated continuously.

Figure 2:
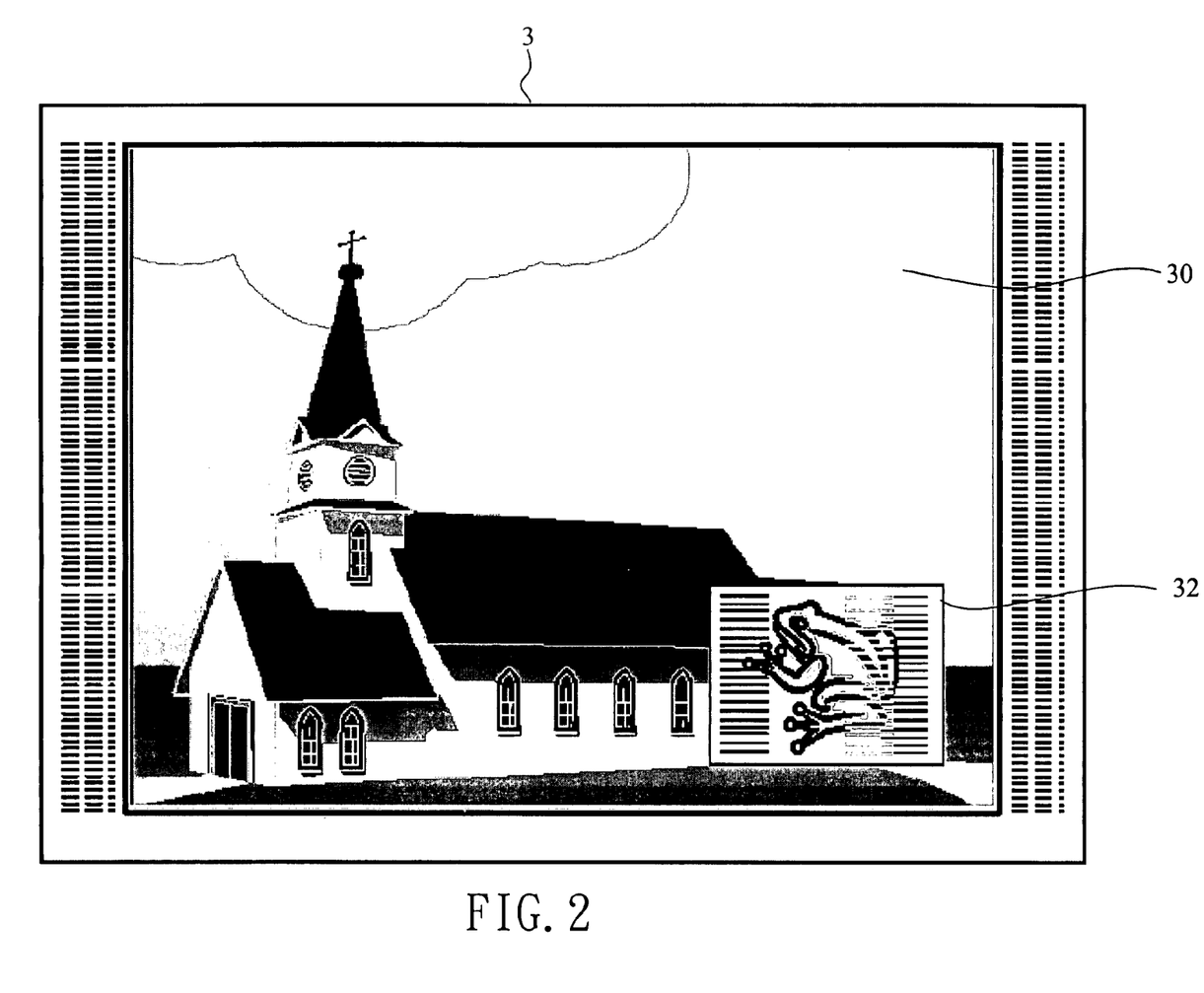
FIG. 2 is a picture-in-picture (PIP) diagram of the present invention.

Please refer to FIG. 2. At the same time when the user watches the content of the first recording/playback region 10 (e.g., a main frame 30 shown in FIG. 2), the DVD player receives a fast forward/reverse signal and enters into the search region 16 (e.g., the sub-frame 32 shown in FIG. 2) so that he can review or preview other contents and search for and set the entry point of the next section he is interested in. When the user finds the frame to be watched and the DVD player receives a section-jump signal, the DVD player will first pass a video transition effect 18 and then smoothly switch from the frame of the search region 16 to the position of the main frame 30 for playback. The main frame 30 is the second recording/playback region 12 mentioned above. After the user wants to find the next section he is interested in, the above steps can be repeated to perform playback of the content of the third recording/playback region 14.

Figure 3:
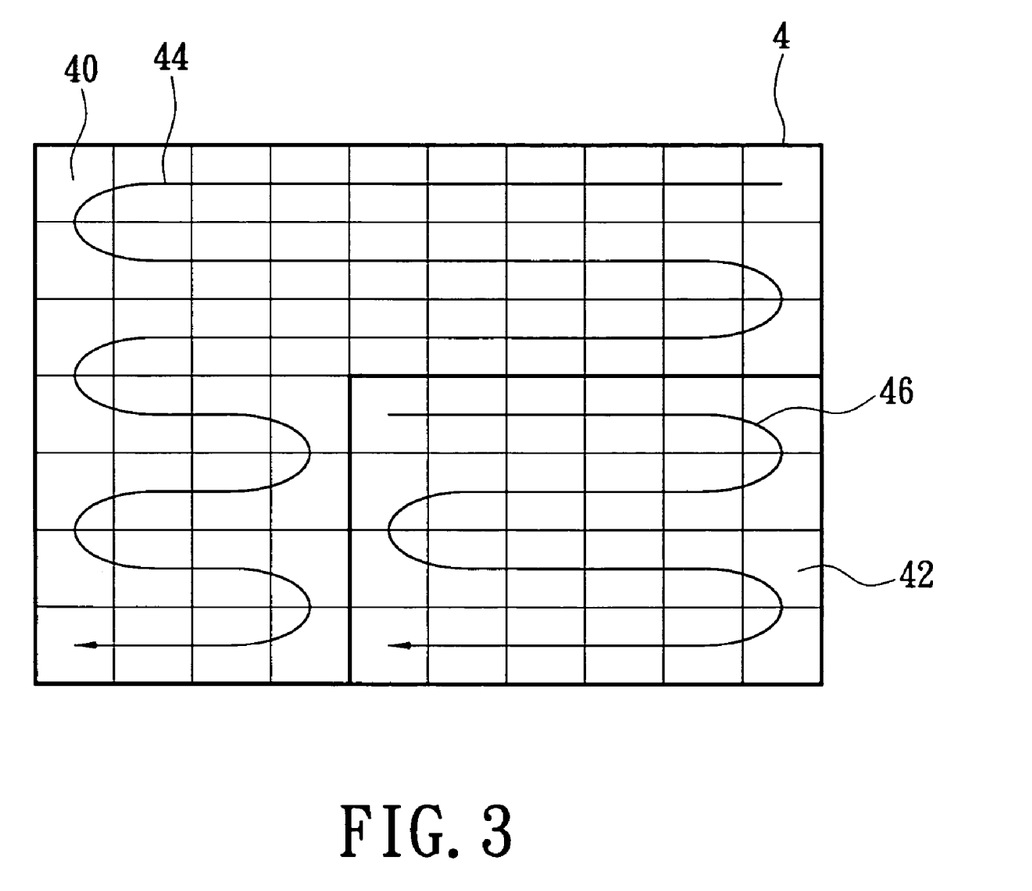
FIG. 3 is a diagram showing multiplex video decoding of the present invention.

FIG. 3 is a diagram showing multiplex video decoding of the present invention. Block-based video techniques like MPEG including a plurality of main frame image compressed blocks 40 and a plurality of sub-frame image compressed blocks 42 are combined. The borders of the main frame and the sub-frame are located at borders of block unit to reduce operational overhead for repetitive decoding of border. The video decoder is operated in a time-sharing multiplex way or a parallel multiplex way to perform a main frame decoding procedure 44 and a sub-frame decoding procedure 46.

Figure 4:
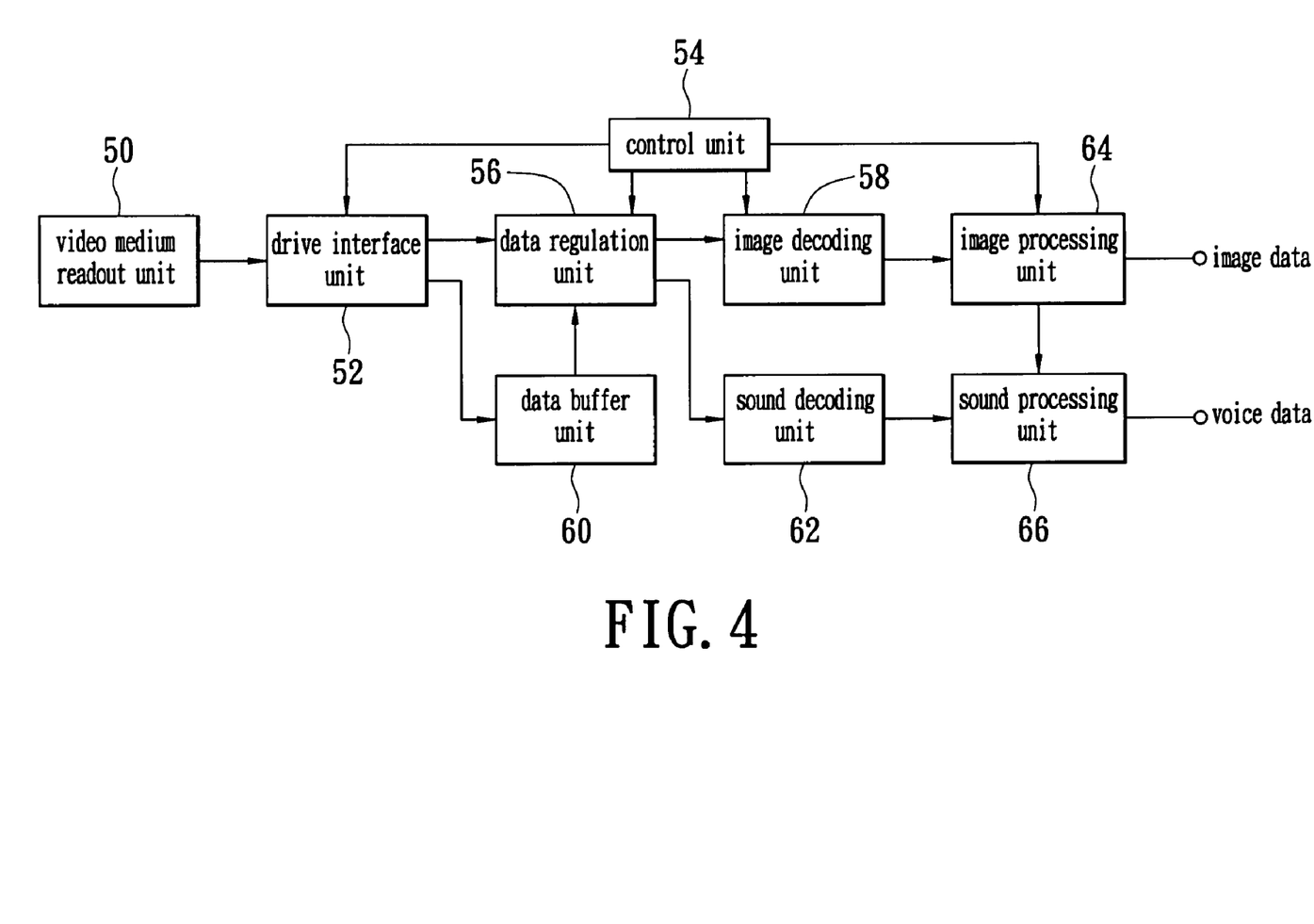
FIG. 4 is a block diagram of a digital video multiplex processing device of the present invention.

As shown in FIG. 4, a digital video multiplex processing device of the present invention comprises a video medium readout unit 50, a drive interface unit 52, a data regulation unit 56, a data buffer unit 60, an image decoding unit 58, a sound decoding unit 62, an image processing unit 64, a sound processing unit 66, and a control unit 54. The video medium readout unit 50 is used to read data in a video medium into an electric digital signal. The video medium can be an optical disc, a hard disc or a network. The drive interface unit 52 is electrically connected with a video medium readout unit to convert the electric digital signal into an ATA interface format. The data regulation unit 56 is electrically connected with the drive interface unit 52. The data regulation unit 56 is responsible for three jobs: split of image and sound data, frame data conversion during fast forward/reverse, and corresponding data conversion due to shrinkage of frame size during playback of the sub-frame.

The data buffer unit 60 is electrically connected with the drive interface unit 52 and the data regulation unit 56 and used to store output data of the drive interface unit 52 and continuously output to the data regulation unit 56 in a multiplex way. The data buffer unit 60 is a memory. Data of different time points on the DVD disc can be temporarily stored in the memory and then continuously outputted in a multiplex way to meet the requirement that the main frame and the sub-frame can separately play different sections of the DVD disc. The image decoding unit 58 is electrically connected with the data regulation unit 56 and used to decode video data of the DVD disc into color information of pixels in frame. If pixels in the sub-frame and the main frame belong to the normal play mode and the fast play mode, respectively, the image decoding unit 58 will get disc data of normal play time points or fast play time points in the data buffer unit 60 via the data regulation unit 56 to accomplish multiplex vide decoding.

The sound decoding unit 62 is electrically connected with the data regulation unit 56 and used to decode sound information of the DVD disc into values of sampled points. The image processing unit 64 is electrically connected with the image decoding unit 58 and used to perform post processing like fade in and fade out of frame and convert them into video data conforming to NTSC or PAL specification for output. The sound processing unit 66 is electrically connected with the sound decoding unit 62 and used to perform post processing like crescendo or decrescendo of volume to the values of sampled points outputted by the sound decoding unit 62 and convert them into sound data conforming to SPDIF or $I^2S$ specification for output. The control unit 54 is electrically connected with the drive interface unit 52, the data regulation unit 56, the image decoding unit 58 and the image processing unit 64 and used to receive operation instructions of a user to control the operation of the digital video multiplex processing device. When the user pressed a search key during playback, the control unit 54 won't interrupt the whole frame for fast forward/reverse. The control unit 54 will instead control operations of the data buffer unit 60, the data regulation unit 56 and the image decoding unit 58 to play the content of fast play within a region of the frame. The video content won't be changed until the user makes sure to jump. Because of the cooperation of the data buffer unit 60, the data regulation unit 56 and the image decoding unit 58, the function of playing the play point and the fast play point in the main frame and the sub-frame can be accomplished.

Figure 5:
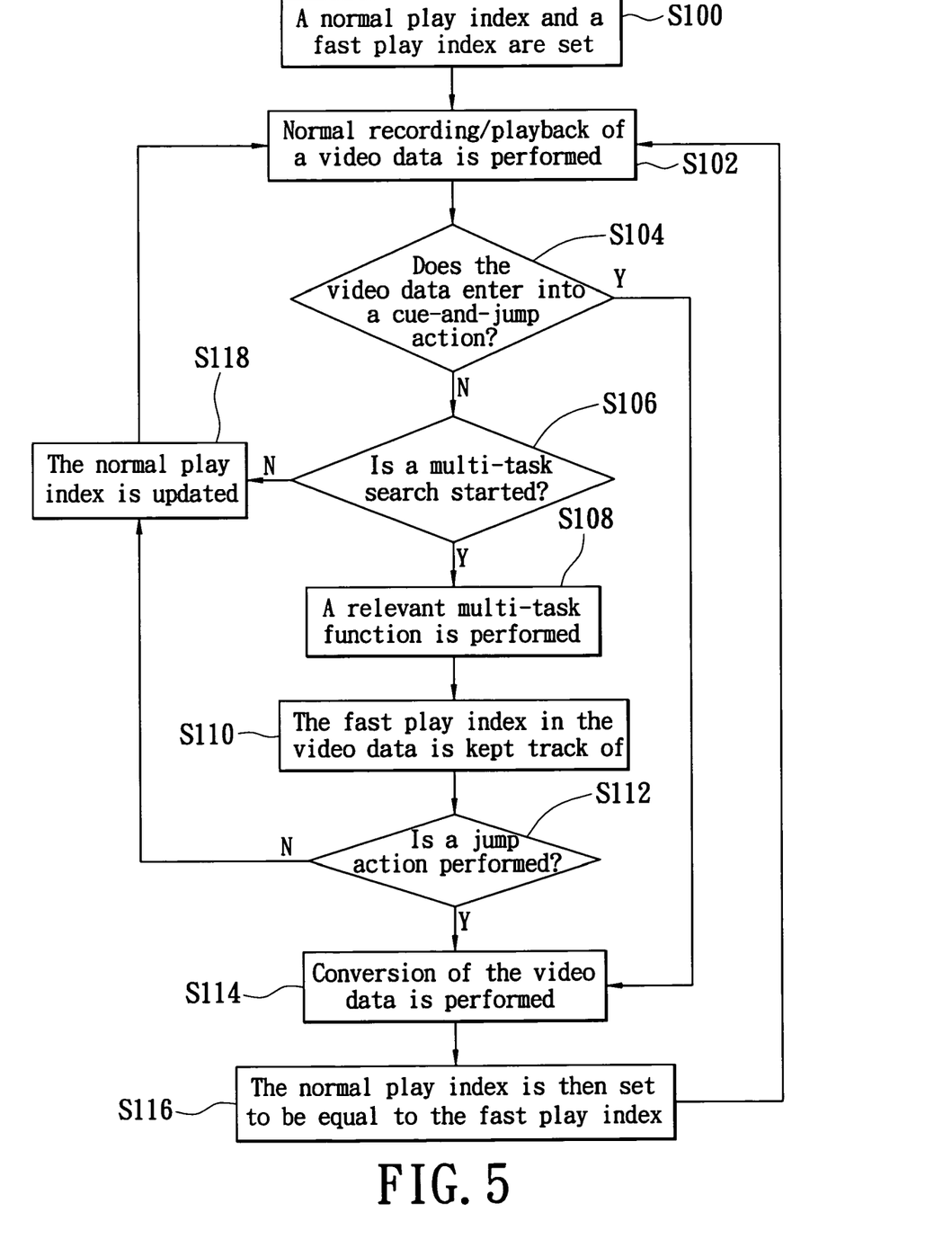
FIG. 5 is a flowchart of a digital video multiplex processing method according to a first embodiment of the present invention.

FIG. 5 is a flowchart of a digital video multiplex processing method according to a first embodiment of the present invention. The digital video multiplex processing method comprises the following steps. First, a normal play index and a fast play index are set (Step S100). Next, normal recording/playback of a video data is performed (Step S102). The video data is divided into a main video data and a sub-video data. The video data comprises image data and sound data. Whether to let the video data enter into a cue-and-jump action is then determined (Step S104). If the answer is no; whether to start a multi-task search is determined (Step S106). In the step of determining whether to start a multi-task search, if the answer is yes, a relevant multi-task function is performed (Step S108). Subsequently, the fast play index in the video data is taken track of (Step S110). Whether to perform a jump action is then determined (Step S112).

In the step of determining whether to perform a jump (Step S112), if the answer is yes, conversion of the video data is performed (Step S114) to switch the main video data and the sub-video data. The normal play index is then set to be equal to the fast play index (Step S116), and the step of performing normal recording/playback of a video data (Step S102) is jumped back to.

In the step of determining whether to let the video data enter into a cue-and-jump action (Step S104), if the answer is yes, the step of performing conversion of the video data is proceeded (Step S114). In the step of determining whether to start a multi-task search (Step S106), if the answer is no, a step of updating the normal play index is performed (Step S118) and then the step of performing normal recording/playback of a video data (Step S102) is jumped back to. In the step of determining whether to perform a jump action (Step S112), if the answer is no, the step of updating the normal play index is proceeded (Step S118) and then the step of performing normal recording/playback of a video data is jumped back to (Step S102).

Figure 6:
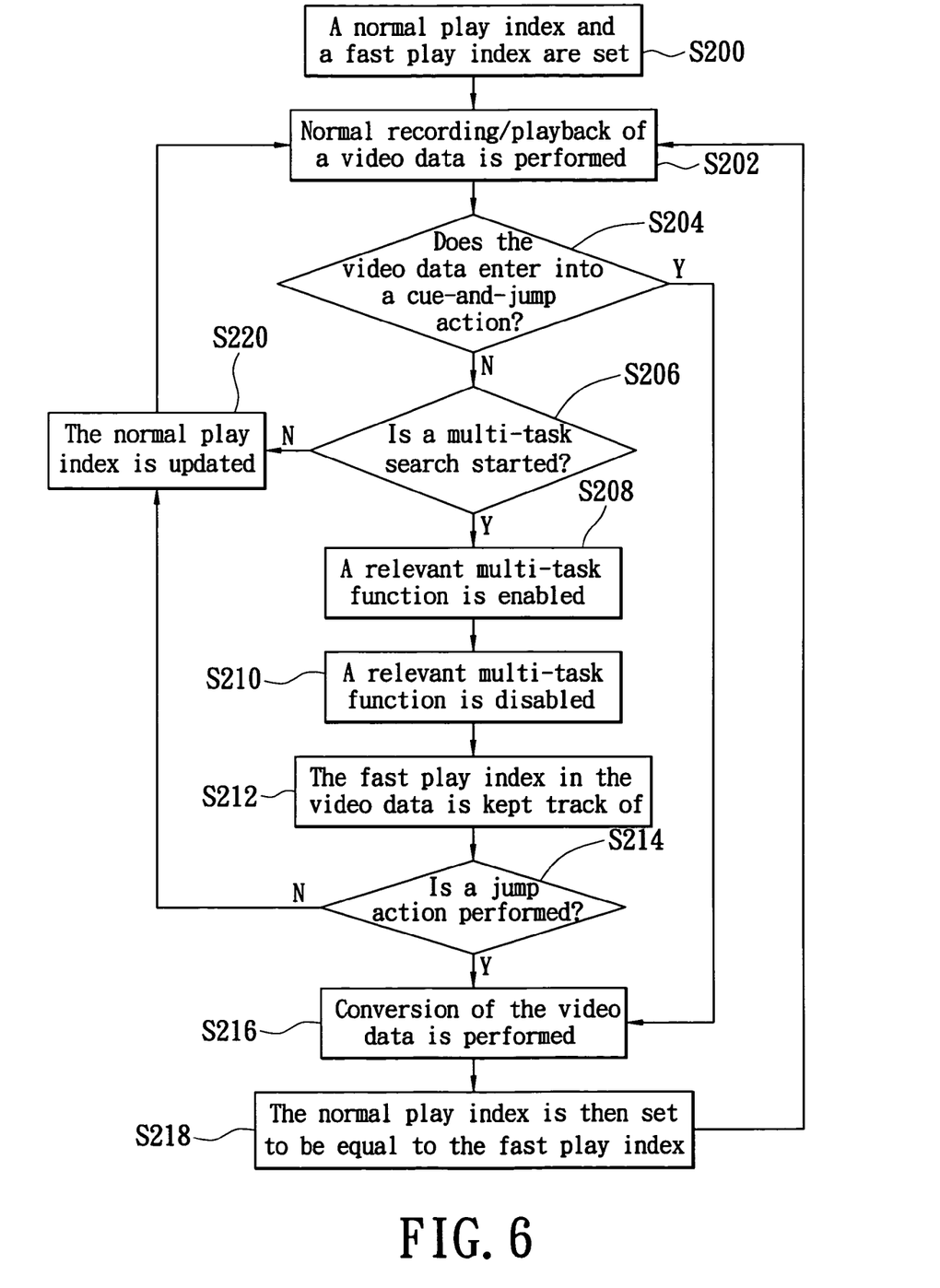
FIG. 6 is a flowchart of a digital video multiplex processing method according to a second embodiment of the present invention.

FIG. 6 is a flowchart of a digital video multiplex processing method according to a second embodiment of the present invention. The digital video multiplex processing method comprises the following steps. First, a normal play index and a fast play index are set (Step S200). Next, normal recording/playback of a video data is performed (Step S202). The video data is divided into a main video data and a sub-video data. The video data comprises image data and sound data. Whether to let the video data enter into a cue-and-jump action is then determined (Step S204). If the answer is no, whether to start a multi-task search is determined (Step S206). In the step of determining whether to start a multi-task search, if the answer is yes, a relevant multi-task function is performed (Step S208). Subsequently, a relevant multi-task function of the video data is disabled (Step S210), and the fast play index in the video data is then taken track of (Step S212). Whether to perform a jump action is then determined (Step S214).

In the step of determining whether to perform a jump (Step S214), if the answer is yes, conversion of the video data is performed (Step S216) to switch the main video data and the sub-video data. The normal play index is then set to be equal to the fast play index (Step S218), and the step of performing normal recording/playback of a video data (Step S202) is jumped back to.

In the step of determining whether to let the video data enter into a cue-and-jump action (Step S204), if the answer is yes, the step of performing conversion of the video data is proceeded (Step S216). In the step of determining whether to start a multi-task search (Step S206), if the answer is no, a step of updating the normal play index is performed (Step S220) and then the step of performing normal recording/playback of a video data (Step S202) is jumped back to. In the step of determining whether to perform a jump action (Step S214), if the answer is no, the step of updating the normal play index is proceeded (Step S220) and then the step of performing normal recording/playback of a video data (Step S202) is jumped back to.

Figure 7:
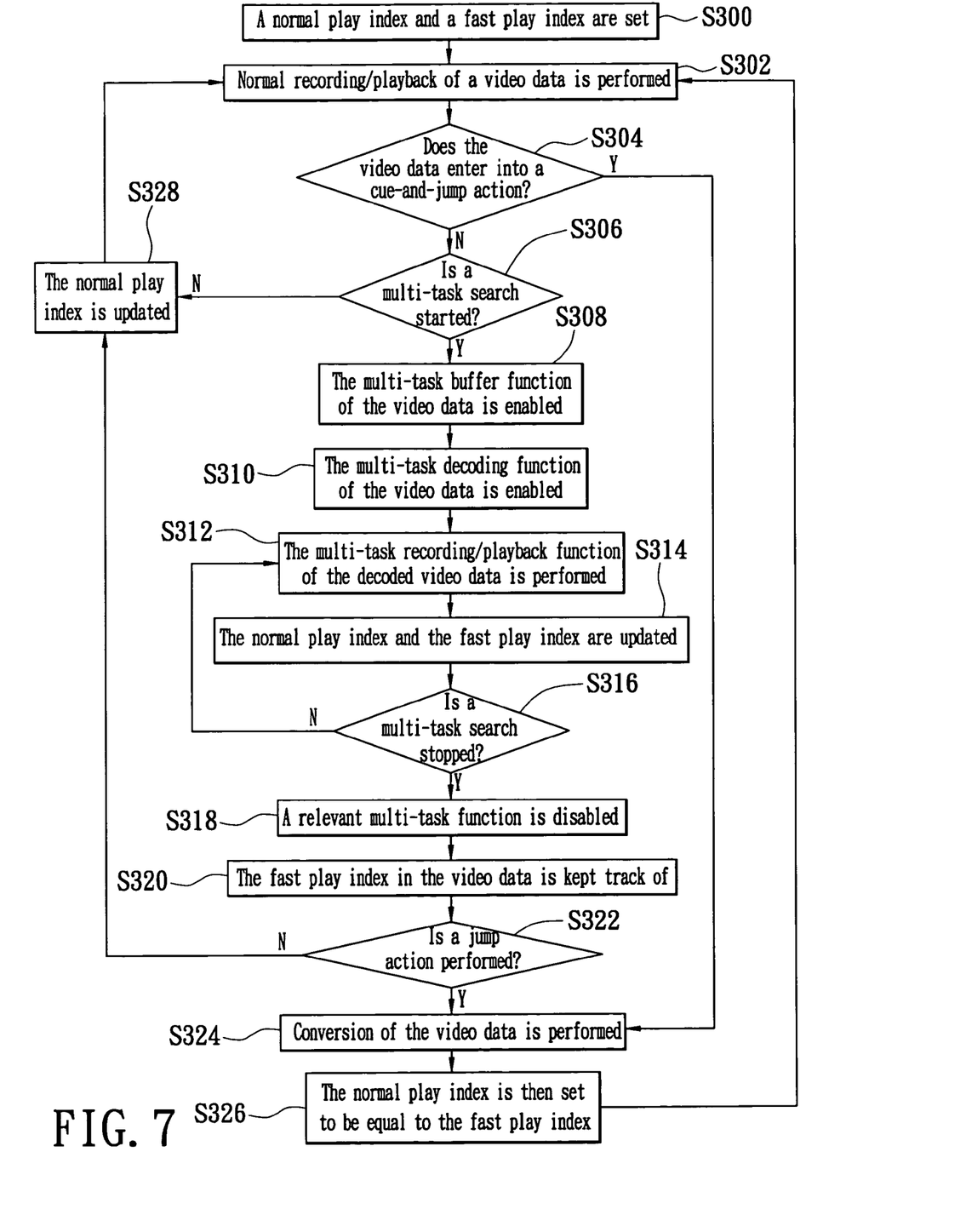
FIG. 7 is a flowchart of a digital video multiplex processing method according to a third embodiment of the present invention.

FIG. 7 is a flowchart of a digital video multiplex processing method according to a third embodiment of the present invention. The digital video multiplex processing method comprises the following steps. First, a normal play index and a fast play index are set (Step S300). Next, normal recording/playback of a video data is performed (Step S302). The video data is divided into a main video data and a sub-video data. The video data comprises image data and sound data. Whether to let the video data enter into a cue-and-jump action is then determined (Step S304). If the answer is no, whether to start a multi-task search is determined (Step S306). In the step of determining whether to start a multi-task search, if the answer is yes, the multi-task buffer function of the video data is enabled (Step S308). The video data is stored into a data buffer unit, and the multi-task decoding function of the video data is then enabled (Step S310). In the step of enabling the multi-task decoding function of the video data, the video data is stored into a data regulation unit, and the image data and the sound data in the video data are decoded, respectively.

Next, multi-task recording/playback function of the decoded video data is performed (Step S312). The playback and fast play of the video data are performed simultaneously. Subsequently, a normal play index and a fast play index are updated (Step S314). Whether to stop a multi-task search is then determined (Step S316). If the answer is yes, a relevant multi-task function of the video data is disabled (Step S318). The fast play index in the video data is then taken track of (Step S320). Subsequently, whether to perform a jump action is determined (Step S322). If the answer is yes, conversion of the video data is performed (Step S324) to switch the main video data and the sub-video data. Next, the normal play index is set to be equal to the fast play index (Step S326). Finally, the step of performing normal recording/playback of a video data (Step S302) is jumped back to.

In the step of determining whether to let the video data enter into a cue-and-jump action (Step S304), if the answer is yes, the step of performing conversion of the video data is proceeded (Step S324). In the step of determining whether to start a multi-task search (Step S306), if the answer is no, a step of updating the normal play index is performed (Step S328) and then the step of performing normal recording/playback of a video data (Step S302) is jumped back to. In the step of determining whether to stop a multi-task search (Step S316), if the answer is no, the step of performing multi-task recording/playback function of the decoded video data (Step S312) is jumped back to. In the step of determining to perform a jump action (Step S322), if the answer is no, the step of updating the normal play index is proceeded (Step S328) and then the step of performing normal recording/playback of a video data is jumped back to (Step S302).

To sum up, the present invention makes use of the techniques of multiplex video decoding and picture-in-picture (PIP) to let a user be able to fast surf, review and search the contents of other sections of a video disc at the same time of playing the video disc. For users being fond of watching a video disc in a jump way, the present invention can effectively enhance the coherence of playback.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A digital video multiplex processing method comprising the steps of:
   setting a normal play index and a fast play index;
   performing a normal recording/playback action of a video data;
   determining whether to start a multi-task search;
   repeating the step of performing the normal recording/playback action of a video data when the multi-task search has not been started;
   performing a multi-task function for executing a playback and a fast forward/reverse of the video data simultaneously and non exclusionary mutually when the multi-task search has started;
   taking track of said fast play index in said video data;
   determining whether to let said video data enter a cue-and-jump action;
   setting said normal play index to be equal to said fast play index when the video data has entered the cue-and-jump action; and
   repeating the step of performing the normal recording/playback action of the video data when the video data has not been entered the cue-and-jump action.

2. A digital video multiplex processing device comprising:
   a video medium readout unit used to read data in a video medium into an electric digital signal, said video medium being a video medium of an optical disc, a hard disc or transmitted via a network;
   a drive interface unit electrically connected with a video medium readout unit to convert said electric digital signal into an ATA interface format;
   a data regulation unit electrically connected with said drive interface unit;
   a data buffer unit electrically connected with said drive interface unit and said data regulation unit and used to store an output video data, a normal play time point and a fast play time point of said drive interface unit and continuously output to said data regulation unit in a multiplex way to accomplish multiplex vide decoding;
   an image decoding unit electrically connected with said data regulation unit;
   a sound decoding unit electrically connected with said data regulation unit;
   an image processing unit electrically connected with said image decoding unit;

a sound processing unit electrically connected with said sound decoding unit; and a control unit electrically connected with said drive interface unit, said data regulation unit, said image decoding unit and said image processing unit, wherein the control unit receives operation instructions of a user to control the operation when said digital video multiplex processing device executes a fast forward/reverse during a playback of the video data, the video data being divided into a main video data and a sub-video data, and being converted and outputted a main frame image compressed block and a sub-frame image compressed block individually to accomplish the playback and the fast forward/reverse of the video data simultaneously and non exclusionary mutually.

3. The digital video multiplex processing device as claimed in claim 2, wherein borders of the sub-frame image and the main frame image is located at borders of a block unit.

4. The digital video multiplex processing device as claimed in claim 2, wherein a multi-task is achieved by a time division multi-task.

5. The digital video multiplex processing device as claimed in claim 2, wherein a multi-task is achieved by a parallel multi-task.

6. The digital video multiplex processing device as claimed in claim 2, wherein the image processing unit utilizes a fade-in, a fade-out, or a sliding effect to output a frame of the video data when executing a cue-and-jump action after the fast forward/reverse processing.

7. The digital video multiplex processing.device as claimed in claim 2, wherein the sound decoding unit uses a crescendo or a decrescendo of volume processing to output a voice when executing a cue-and-jump action after the fast forward/reverse processing.

8. The digital video multiplex processing method as claimed in claim 1, wherein in the step of performing a normal recording/playback action of a video data, further comprises the steps of:
    determining whether to let said video data enter a cue-and-jump action;
    repeating the step of performing the normal recording/playback action of a video data when the video data has not been entered the cue-and-jump action; and
    performing the cue-and-jump action when the video data has entered the cue-and-jump action.

9. The digital video multiplex processing method as claimed in claim 1, wherein in the step of determining whether to let said video data enter a cue-and-jump action, further comprises a step of performing conversion of a video data.

10. The digital video multiplex processing method as claimed in claim 8, wherein in the step of determining whether to let said video data enter a cue-and-jump action, further comprises a step of performing conversion of a video data.

11. The digital video multiplex processing method as claimed in claim 1, wherein in the step of performing a multi-task function further comprises a step of enabling the multi-task function of the video data and a step of disabling the multi-task function of the video data.

12. The digital video multiplex processing method as claimed in claim 11, wherein in the step of enabling the multi-task function of the video data, further comprises:
    enabling a multi-task buffer function of the video data;
    enabling a multi-task decoding function of the video data;
    performing a multi-task recording/playback function of the decoded video data;
    updating the normal play index and the fast play index;
    determining whether to stop the multi-task search;
    performing the step of disabling the multi-task function of the video data when the multi-task search has been stopped;
    performing the step of updating the normal play index and return to the step of performing a normal recording/playback action of a video data when the multi-task search has not been stopped.

13. The digital video multiplex processing method as claimed in claim 1, wherein the multi-task function is achieved through by a main frame image of a main video data and a sub-frame image of a sub-video data.

14. A digital video multiplex processing method comprising the steps of:
    setting a normal play index and a fast play index;
    performing a recording/playback action of a video data of the normal play index;
    determining whether to start a multi-task search;
    updating the normal play index and returning to the step of performing a recording/playback action of a video data when the multi-task search has not been started; and
    performing a multi-task function and recording the fast play index of the video data, and continuing to update the normal play index to accomplish a playback and a fast forward/reverse of the video data simultaneously and non exclusionary mutually when the multi-task search has been started.

15. The digital video multiplex processing method as claimed in claim 14, wherein the step of recording the fast play index of the video data further comprises:
    determining whether to let said video data enter a cue-and-jump action;
    updating the normal play index when the cue-and-jump action has not been entered;
    when the cue-and-jump action has been entered, further comprises:
        setting the normal play index to be equal to the fast play index; and
        repeating the step of performing a recording/playback action of a video data of the normal play index.

16. The digital video multiplex processing method as claimed in claim 14, wherein in the step of performing a recording/playback action of a video data of the normal play index further comprises:
    determining whether to let said video data enter a cue-and-jump action;
    determining whether to start a multi-task search when the cue-and-jump action has not been entered;
    when the cue-and-jump action has been entered, further comprises:
        setting the normal play index to be equal to the fast play index; and
        repeating the step of performing a recording/playback action of a video data of the normal play index.

17. The digital video multiplex processing method as claimed in claim 14, wherein the step of executing the cue-and-jump action further comprises a step of executing a video data conversion action.

18. The digital video multiplex processing method as claimed in claim 16, wherein the step of executing the cue-and-jump action further comprises a step of executing a video data conversion action.

* * * * *